United States Patent [19]
Kaneko

[11] Patent Number: 5,213,051
[45] Date of Patent: May 25, 1993

[54] APPARATUS FOR INCINERATING WASTE MATERIAL

[75] Inventor: Masamoto Kaneko, Takasaki, Japan

[73] Assignee: Kinsei Sangyo Co., Ltd., Takasaki, Japan

[21] Appl. No.: 850,591

[22] Filed: Mar. 13, 1992

[30] Foreign Application Priority Data

Nov. 20, 1991 [JP] Japan .................. 3-305066
Nov. 20, 1991 [JP] Japan .................. 3-305067

[51] Int. Cl.$^5$ .............................. F23G 5/12
[52] U.S. Cl. .................... 110/229; 110/190; 110/235
[58] Field of Search ............... 110/229, 235, 188, 190; 48/111

[56] References Cited

U.S. PATENT DOCUMENTS 4,870,910 10/1989 Wright et al. ............. 110/190
4,913,069 4/1990 Schultz et al. ............ 110/229 X
5,101,739 4/1992 Nance et al. .............. 110/229

FOREIGN PATENT DOCUMENTS 2-135280 5/1990 Japan .

Primary Examiner—Edward G. Favors
Attorney, Agent, or Firm—Paul A. Guss

[57] ABSTRACT

A waste material such as waste tires is incinerated by way of dry distillation and gasification. In a gasification furnace, a portion of the waste material is burned and the remainder is thermally decomposed by dry distillation with the heat of combustion, producing a combustible gas. A combustion furnace combusts the combustible gas introduced from the gasification furnace. The gasification furnace is supplied with an amount of oxygen required to burn the portion of the waste material and to thermally decompose the remainder while at the same time the amount of oxygen supplied to the gasification furnace is controlled to maintain, at a substantially constant value, the temperature of the combustible gas during the dry distillation of the waste material. The gasification furnace is also supplied with an amount of oxygen to accelerate the combustion and ashing of the waste material when the dry distillation is finished. When the dry distillation is finished, the amount of oxygen supplied to the gasification furnace is increased to accelerate the combustion and ashing of the waste material if the temperature in the gasification furnace increases up to a predetermined temperature or higher as the combustion of the waste material progresses and also if the temperature of the combustible gas drops from the substantially constant value to a predetermined temperature or lower.

32 Claims, 4 Drawing Sheets

APPARATUS FOR INCINERATING WASTE MATERIAL

BACKGROUND OF THE INVENTION

1. Field of the Invention

The present invention relates to an apparatus for incinerating waste materials such as waste tires, for example.

2. Description of the Prior Art

One known apparatus for incinerating waste materials such as waste tires is disclosed in Japanese Laid-Open Patent Publication No. 2-135280. Specifically, the disclosed incinerating apparatus comprises an apparatus for incinerating a waste material by processing the waste material through dry distillation and gasification.

The disclosed incinerating apparatus has a gasification furnace in which a waste material is placed. In the gasification furnace, a portion of the waste material is burned while the remainder of the waste material is subjected to dry distillation (i.e., thermally decomposed) with the heat of combustion, until finally the waste material is fully burned and ashed. A combustible gas produced when the waste material is thermally decomposed is introduced through a gas passage into an combustion furnace. In the combustion furnace, the supplied combustible gas is mixed with oxygen (air) and burned at a temperature high enough to reduce nitrogen oxides to a sufficiently small level. In this manner, the waste material is incinerated without causing environmental pollution problems which would otherwise be posed by the generation of nitrogen oxides.

The thermal energy generated when the combustible gas is burned is used as a heat source for a boiler or the like. The generated thermal energy is therefore effectively utilized in the process of incinerating the waste material.

More specifically, the combustion of a portion of the waste material and the dry distillation of the remainder thereof in the gasification furnace, and the combustion of the combustible gas in the combustion furnace are carried out as follows:

The combustion of a portion of the waste material and the dry distillation of the remainder thereof in the gasification furnace are started when the portion of the waste material is ignited after the waste material is charged into the gasification furnace. When the portion of the waste material starts being combusted, the remaining waste material starts being subjected to dry distillation by the heat of combustion, and the combustible ga starts being generated by the dry distillation. As the dry distillation process progresses, the combustible gas is generated in a progressively larger quantity. Oxygen required to ignite the waste material and oxygen required to burn the portion of the waste material immediately after it has been ignited are supplied from the air in the gasification furnace.

The combustible gas generated in the gasification furnace is delivered through the gas passage and admitted into the combustion furnace in which the combustible gas is mixed with oxygen and ignited by an igniter mounted in the combustion furnace. At this time, the temperature of the combustible gas as it is burned in the combustion furnace is detected by a temperature sensor disposed in the combustion furnace. The detected temperature rises as the amount of the combustible gas generated in the gasification furnace becomes larger and so does the the amount of the combustible gas introduced into the combustion furnace. When the combustible gas starts being combusted in the combustion furnace, an oxygen supply device connected to the gasification furnace operates to supply the gasification furnace with the oxygen that is needed to burn the portion of the waste material and thermally decompose the remaining waste material. The oxygen is supplied to the gasification furnace at a rate that is regulated to keep the detected temperature of the combustible gas at a predetermined, substantially constant level for reducing any nitrogen oxides to a sufficiently small amount.

More specifically, when the temperature of the combustible gas becomes lower than the predetermined, substantially constant temperature, the amount of oxygen supplied to the gasification furnace is increased to accelerate the combustion of the portion of the waste material and the dry distillation of the remainder of the waste material. As a result, the combustible gas is produced in an increased quantity, thereby increasing the temperature of the combustible gas in the combustion furnace.

Conversely, when the temperature of the combustible gas becomes higher than the predetermined, substantially constant temperature, the amount of oxygen supplied to the gasification furnace is reduced to suppress the combustion of the portion of the waste material and the dry distillation of the remainder of the waste material. As a consequence, the combustible gas is produced in a reduced quantity, thereby lowering the temperature of the combustible gas in the combustion furnace.

In this manner, the temperature of the combustible gas as it is burned in the combustion furnace is maintained at the substantially constant level for sufficiently reducing any nitrogen oxides. The combustible gas is substantially completely burned in the combustion furnace without causing an environmental pollution. At the same time, the combustion of the portion of the waste material and the dry distillation of the remainder of the waste material are allowed to progress smoothly in the gasification furnace. The thermal energy produced when the combustible gas is burned can be effectively utilized as a heat source for a boiler or the like. The partial combustion of the waste material in the gasification furnace is progressively shifted into a region of the waste material where the combustible gas has been generated, i.e., is carried out in a region of the waste material where it is thermally decomposed. Accordingly, the partial combustion takes place while producing almost no nitrogen oxides.

Upon the dry distillation of the waste material, the waste material is progressively ashed as the partial combustion of the waste material progresses. Therefore, the combusted portion of the waste material is progressively shifted into another region where the dry distillation is substantially finished, and the portion of the waste material which can be thermally decomposed by dry distillation is progressively reduced.

Eventually, the waste material in the gasification furnace becomes unable to produce the amount of combustible gas which is required to keep the temperature of the combustible gas at the substantially constant level in the combustion furnace. Thus, the temperature of the combustible gas as it is turned is lowered. At this stage, the waste material in the gasification furnace is burned in a substantial portion thereof except the portion that has already by ashed. Thereafter, the waste material is finally ashed by the combustion thereof.

If the waste material were burned while being subjected to an insufficient degree of dry distillation, then an increased amount of nitrogen oxides would be produced. Therefore, the waste material should preferably be burned after it has been subjected to as much dry distillation as possible. To burn the combustible gas while minimizing the generation of nitrogen oxides, it is preferable that the combustible gas be produced by dry distillation in order to keep itself at a substantially constant temperature to minimize nitrogen oxides. Furthermore, from the standpoint of better incineration of the waste material, the waste material should preferably be burned and ashed when the dry distillation thereof is smoothly and reliably completed.

To meet the above requirements, while the dry distillation of the waste material is in progress in the conventional incinerating apparatus, oxygen is supplied from the oxygen supply device to the gasification furnace to keep the temperature of the combustible gas at a substantially constant level for continuous and stable combustion of a portion of the waste material and also continuous and stable dry distillation of the remaining waste material, as described above. When the dry distillation is finished, the oxygen supply device supplies an increased amount of oxygen to the gasification furnace according to the temperature in the gasification furnace as detected by a temperature sensor therein for promoting final combustion and ashing of the waste material.

Specifically, while the dry distillation of the waste material progresses in a stable state, the temperature in the gasification furnace progressively goes up as the combustion of the portion of the waste material progresses, even though part of the heat of the combusted portion is absorbed by the thermally decomposed portion of the waste material. When the dry distillation is in a final stage, after the temperature sharply rises as described above, since the thermally decomposed portion of the waste material is reduced, and so is the heat of the combusted portion which is absorbed by the thermally decomposed portion, the temperature in the gasification furnace decreases as the combustion and ashing of the portion of the waste material progress.

In the conventional incinerating apparatus, when the temperature in the gasification furnace exceeds a predetermined temperature that has been selected experimentally and empirically, any portion of the waste material that can be thermally decomposed by dry distillation is regarded as being almost eliminated, and the amount of oxygen supplied to the gasification furnace is increased to accelerate the final combustion and ashing of the waste material.

However, because the amount of oxygen supplied to the gasification furnace is increased based on only the temperature in the gasification furnace upon final ashing of the waste material, the conventional incinerating apparatus has suffered from the following drawbacks:

As described above, in general, the temperature in the gasification furnace sharply rises and then drops in the final stage of dry distillation of the waste material. The temperature in the gasification furnace does not vary uniformly and smoothly, but is generally subjected to temporary fluctuations depending on various conditions, e.g., the type of the waste material being incinerated, the manner in which the waste material is placed, etc.

Even when a substantial portion of the waste material remains to be thermally decomposed by dry distillation, there may be temporary situations when the dry distillation does not take place smoothly depending on the type of waste material being incinerated, the manner in which the waste material is placed in the furnace, or other conditions. Consequently, the heat of the combusted portion of the waste material that is absorbed by the thermally decomposed portion thereof is temporarily reduced, with the result that the temperature in the gasification furnace may rise beyond the predetermined temperature which is used for determining the timing of final ashing of the waste material.

If this happens, regardless of the presence of a substantial portion of the waste material that can still be thermally decomposed by dry distillation, the amount of oxygen supplied to the gasification furnace is increased to accelerate the combustion and ashing of the waste material. Therefore, the waste material which has not been fully thermally decomposed yet is burned, producing an increased amount of nitrogen oxides and an unstable amount of combustible gas, which tends to produce a large amount of nitrogen oxides when burned.

Moreover, when the oxygen in the gasification furnace is present in an amount larger than necessary when the waste material is thermally decomposed by dry distillation, the combustible gas produced by the dry distillation of the waste material may be mixed with sufficient oxygen to burn the combustible gas, and the mixture may be introduced from the gasification furnace into the combustion furnace. In this case, the flames produced when the combustible gas is burned in the combustion furnace and the flames of the igniter are liable to be propagated from the combustion furnace through the gas passage into the gasification furnace, burning the combustible gas in the gasification furnace and the gas passage, a phenomenon known as a backfire. When such a backfire occurs, the temperature in the combustion and gasification furnaces greatly increases, tending to damage the combustion and gasification furnaces and various devices mounted therein.

The amount of oxygen in the gasification furnace is apt to become more than necessary particularly when the portion of the waste material is burned unstably, or when the combusted portion of the waste material is small, consuming a relatively small amount of oxygen, or when the combustible gas produced by the thermally decomposed portion of the waste material is comparatively small, or when external air flows into the gasification furnace because of poor insulation between the gasification furnace and the exterior space, during the initial stage of combustion and dry distillation of the waste material immediately after it has been ignited.

In the conventional incinerating apparatus, oxygen in the gasification furnace is utilized when the waste material is ignited and the portion of the waste material is burned right after the waste material has been ignited, and a single region of the waste material is ignited by a single igniter. Accordingly, the portion of the waste material is likely to be burned unstable in the initial stage, and the combusted portion of the waste material is small.

Even under such a condition, once the waste material is thermally decomposed by dry distillation and the produced combusted gas is ignited in the combustion furnace, the oxygen supply device supplies the gasification furnace with an amount of oxygen for keeping the temperature of the combustible gas at a substantially constant level. That is, the gasification furnace may be supplied with more oxygen than necessary while the combustion of the portion of the waste material is unstable and the oxygen combustion is small. For these reason, backfire is likely to happen in the conventional incinerating apparatus.

SUMMARY OF THE INVENTION

In view of the aforesaid difficulties of the conventional incinerating apparatus, it is a first object of the present invention to provide an apparatus for incinerating a waste material by processing the waste material through dry distillation and gasification, the apparatus having a gasification furnace for burning a portion of the waste material and thermally decomposing the remainder of the waste material by way of dry distillation to produce a combustible gas, and a combustion furnace for combusting the combustible gas at a substantially constant temperature, the apparatus being capable of thermally decomposing the waste material as continuously as possible for stably producing the combustible gas and for smoothly and reliably carrying out final combustion and ashing of the waste material after it has been thermally decomposed by dry distillation.

It is a second object of the present invention to provide an apparatus for incinerating a waste material by processing the waste material through dry distillation and gasification, the apparatus being capable of preventing backfire from occurring due to the flames of a combustible gas propagated from a combustion furnace through a gas passage into a gasification furnace.

To achieve the first object referred to above, there is provided in accordance with a first aspect of the present invention an apparatus for incinerating a waste material by processing the waste material through dry distillation and gasification, comprising a gasification furnace for storing a waste material therein and burning a portion of the waste material and thermally decomposing the remainder of the waste material by way of dry distillation with the heat of combustion of the portion of the waste material, thereby producing a combustible gas, a combustion furnace for combusting the combustible gas introduced therein from the gasification furnace through a gas passage, first temperature detecting means for detecting the temperature in the gasification furnace, second temperature detecting means for detecting the temperature of the combustible gas as it is burned in the combustion furnace, and oxygen supply means for supplying the gasification furnace with an amount of oxygen required to burn the portion of the waste material and to thermally decompose the remainder of the waste material while controlling the amount of oxygen supplied to the gasification furnace to maintain, at a substantially constant value, the temperature of the combustible gas as detected by the second temperature detecting means during the dry distillation of the waste material, and for supplying the gasification furnace with an amount of oxygen to accelerate the combustion and ashing of the waste material when the dry distillation of the waste material is finished, the oxygen supply means comprising means for increasing the amount of oxygen supplied to the gasification furnace to accelerate the combustion and ashing of the waste material if the temperature in the gasification furnace as detected by the first temperature detecting means increases up to a first predetermined temperature or higher as the combustion of the waste material progresses and also if the temperature of the combustible gas as detected by the second temperature detecting means drops from the substantially constant value to a second predetermined temperature or lower, when the dry distillation of the waste material is finished.

According to a second aspect of the present invention, the oxygen supply means comprises means for increasing the amount of oxygen supplied to the gasification furnace to accelerate the combustion and ashing of the waste material if the temperature in the gasification furnace as detected by the first temperature detecting means increases up to a predetermined temperature or higher as the combustion of the waste material progresses, and also if the temperature in the gasification furnace remains at the predetermined temperature or higher for a predetermined period of time after the temperature has increased up to the predetermined temperature or higher, when the dry distillation of the waste material is finished.

In the above first and second aspects, the portion of the waste material is burned and the remainder thereof is thermally decomposed by dry distillation in the gasification furnace by the oxygen which is supplied from the oxygen supply means to the gasification furnace so that the temperature of the combustible gas as it is burned in the combustion furnace will be substantially constant. As the combustion and dry distillation of the waste material progresses, the amount of the waste material which is capable of generating the combustible gas by way of dry distillation is reduced. When the dry distillation is finished, the combustible gas can no longer be generated in a quantity large enough to keep the temperature of the combustible gas substantially constant in the combustion furnace. The amount of the combustible gas which is generated is therefore reduced, and so is the temperature of the combustible gas in the combustion furnace. Generally, the temperature in the gasification furnace progressively increases as the partial combustion of the waste material continuously progresses while the dry distillation of the waste material is going on with the temperature of the combustible gas being substantially constant. Then, as the quantity of the waste material which can be thermally decomposed is reduced when the dry distillation is finished, the temperature in the gasification sharply rises and then drops as the combustion and ashing of the waste material progresses. However, depending on the manner in which the waste material is stored or the type of the waste material, the dry distillation may become unstable, and the heat of combustion that is absorbed by the dry distillation may be reduced, causing a sharp rise in the temperature in the gasification furnace.

According to the first aspect of the present invention, when the temperature in the gasification furnace as detected by the first temperature detecting means increases up to the predetermined temperature at which the dry distillation can be regarded as being finished, and also when the temperature of the combustible gas as detected by the second temperature detecting means drops from the substantially constant value to the predetermined temperature or lower, the amount of oxygen supplied from the oxygen supply means to the gasification furnace is increased to accelerate and smoothly carry out the combustion and ashing of the waste material when the dry distillation is sufficiently effected and the portion of the waste material that can be thermally decomposed is greatly reduced.

According to the second aspect of the present invention, when the temperature in the gasification furnace as detected by the first temperature detecting means increases up to the predetermined temperature at which the dry distillation can be regarded as being finished, and also when the temperature in the gasification furnace remains at the predetermined temperature or higher upon elapse of the predetermined period of time after the temperature in the gasification furnace reaches the predetermined temperature, the amount of oxygen supplied from the oxygen supply means to the gasification furnace is increased to accelerate and smoothly carry out the combustion and ashing of the waste material when the dry distillation is sufficiently effected and the portion of the waste material that can be thermally decomposed is greatly reduced.

In the first and second aspects, the waste material in the gasification furnace is ignited at a lower portion of the gasification furnace. While the dry distillation of the waste material is in progress, the gasification furnace is supplied with oxygen from the bottom thereof. When the dry distillation is finished, the gasification furnace is supplied with oxygen at a higher portion of the gasification furnace. Therefore, the combustion of the portion of the waste material and the dry distillation of the remainder of the waste material are smoothly carried out in the lower and upper portions of the gasification furnace. When the waste material is finally ashed, the gasification furnace is supplied with oxygen at a position close to the combusted portion of the waste material for smoothly ashing the waste material.

The first temperature detecting means is disposed in an upper portion of the gasification furnace so that it can stably detect the temperature in the gasification furnace without being greatly affected by the combusted portion of the waste material.

In the first and second aspects, the apparatus further includes second oxygen supply means for supplying the combustion furnace with an amount of oxygen required to completely combust the combustible gas introduced into the combustion furnace, the second oxygen supply means comprising means for varying the amount of oxygen supplied to the combustion furnace depending on a change in the temperature of the combustible gas as detected by the second temperature detecting means while the dry distillation of the waste material progresses.

Consequently, since the combustible gas is mixed with an amount of oxygen depending on the amount of the combustible gas introduced into the combustion furnace, the combustible gas can reliably be completely combusted.

The combustion furnace comprises a burner nozzle for mixing and igniting the combustible gas and the oxygen, and a combustion chamber for combusting the combustible gas mixed with the oxygen. At this time, the temperature of the combustible gas as it is burned in the combustion chamber is detected by the second temperature detecting means. The second temperature detecting means can therefore stably detect the temperature of the combustible gas without being greatly affected by flames produced when the combustible gas is ignited by the burner nozzle.

To achieve the second object, there is provided in accordance with a third aspect of the present invention an apparatus for incinerating a waste material by processing the waste material through dry distillation and gasification, comprising a gasification furnace for storing a waste material therein and burning a portion of the waste material and thermally decomposing the remainder of the waste material by way of dry distillation with the heat of combustion of the portion of the waste material, thereby producing a combustible gas, a combustion furnace for combusting the combustible gas introduced therein from the gasification furnace through a gas passage, igniting means for igniting the waste material stored in the gasification furnace, temperature detecting means for detecting the temperature of the combustible gas as it is burned in the combustion furnace, oxygen supply means for supplying the gasification furnace with an amount of oxygen required to burn the portion of the waste material and to thermally decompose the remainder of the waste material, and further to increase the temperature of the combustible gas as detected by the temperature detecting means and maintain the increased temperature at a substantially constant value after the portion of the waste material starts being burned and the remainder of the waste material starts being thermally decomposed, and oxygen detecting means in the gas passage for detecting an amount of oxygen mixed with the combustible gas introduced from the gasification furnace into the combustion furnace, the oxygen supply means comprising means for stopping the supply of oxygen to the gasification furnace when the amount of oxygen as detected by the oxygen detecting means exceeds a predetermined value.

According to a fourth aspect of the present invention, the oxygen supply means comprises means for increasing stepwise and limiting the amount of oxygen supplied to the gasification furnace to an extent which allows the portion of the waste material to be continuously burned when the temperature of the combustible gas as detected by the temperature detecting means increases after the waste material stored in the gasification furnace is ignited.

According to a fifth aspect of the present invention, the oxygen supply means comprises means for stopping the supply of oxygen to the gasification furnace when a rate of change per unit time of the temperature of the combustible gas exceeds a predetermined value and when the temperature of the combustible gas as detected by the temperature detecting means increases after the waste material stored in the gasification furnace is ignited.

In the third aspect of the present invention, when the portion of the waste material stored in the gasification furnace is ignited by the igniting means to start burning the portion of the waste material and thermally decomposing the remainder of the waste material by way of dry distillation, the combustible gas produced by the dry distillation is introduced through the gas passage into the combustion furnace in which the combustible gas is combusted. At this time, the amount of oxygen required to burn the portion of the waste material and to thermally decompose the remainder of the waste material is supplied from the oxygen supply means to the gasification furnace in order to increase the temperature of the combustible gas as detected by the temperature detecting means and maintain the increased temperature at the substantially constant value. The amount of oxygen mixed with the combustible gas introduced from the gasification furnace to the combustion furnace is detected by the oxygen detecting means in the gas passage. When the detected amount of oxygen exceeds the predetermined value, the supply of oxygen from the oxygen supply means to the gasification furnace is stopped. Thus, the gasification furnace is prevented from being supplied with oxygen in an amount greater than necessary, and hence the combustible gas generated in the gasification furnace is prevented from being mixed with a large amount of oxygen which could burn the combustible gas before the combustible gas is introduced into the combustion furnace. Consequently, flames produced when the combustible gas is burned in the combustion furnace are prevented from being propagated into the gasification furnace and the gas passage, with the result that undesirable backfires can be prevented from occurring.

In the fourth aspect of the present invention, the amount of oxygen supplied to the gasification furnace is increased stepwise and limited to an extent which allows the portion of the waste material to be continuously burned when the temperature of the combustible gas as detected by the temperature detecting means increases after the waste material stored in the gasification furnace is ignited. In an initial stage of the dry distillation of the waste material, the gasification furnace is prevented from being supplied with more oxygen than necessary, and the combustion of the portion of the waste material and the dry distillation of the remainder of the waste material are progressively stabilized. The combustible gas generated in the gasification furnace is therefore prevented from being mixed with a large amount of oxygen which could burn the combustible gas before the combustible gas is introduced into the combustion furnace.

In the fifth aspect of the present invention, if the amount of oxygen mixed with the combustible gas introduced into the combustion furnace is relatively large, then the combustible gas is intensively burned in the combustion furnace, giving rise to a sharp increase in the temperature of the combustible gas as it is burned in the combustion furnace. When the rate of change per unit time of the temperature of the combustible gas exceeds the predetermined value when the temperature of the combustible gas increases, the supply of oxygen to the gasification furnace is stopped to prevent the combustible gas generated in the gasification furnace from being mixed with a large amount of oxygen which could burn the combustible gas before the combustible gas is introduced into the combustion furnace.

With the above aspects combined together, it is possible to reliably prevent the combustible gas generated in the gasification furnace from being mixed with a large amount of oxygen which could burn the combustible gas before the combustible gas is introduced into the combustion furnace.

In the third through fifth aspects, the igniting means comprises a plurality of igniters disposed on a surrounding wall of the gasification furnace for igniting the waste material at a plurality of locations at the surrounding wall of the gasification furnace.

Inasmuch as the waste material starts being burned at the plural locations in the gasification furnace, the amount of oxygen consumed by the combustion of the portion of the waste material is relatively large in the initial stage of the dry distillation. This is also effective to prevent the combustible gas generated in the gasification furnace from being mixed with a large amount of oxygen which could burn the combustible gas before the combustible gas is introduced into the combustion furnace.

According to the third through fifth aspects, the apparatus also includes extinguishing means for extinguishing the combustion of the waste material when the amount of oxygen as detected by the oxygen detecting means exceeds the predetermined value or when the rate of change per unit time of the temperature of the combustible gas exceeds a predetermined value when the temperature of the combustible gas as detected by the temperature detecting means increases after the waste material stored in the gasification furnace is ignited.

Therefore, when the combustible gas is introduced into the combustion furnace as it is mixed with the amount of oxygen large enough to burn the combustible gas, the combustion of the waste material in the gasification furnace is extinguished by the extinguishing means, thus stopping the dry distillation of the waste material and also the generation of the combustible gas. Accordingly, backfires are also prevented from taking place and going from the combustion furnace into the gasification furnace and the gas passage.

The above and other objects, features, and advantages of the present invention will become apparent from the following description when taken in conjunction with the accompanying drawings which illustrate preferred embodiments of the present invention by way of example.

DETAILED DESCRIPTION OF THE PREFERRED EMBODIMENTS

An apparatus for incinerating waste materials such as waste tires according to the present invention will be described with reference to FIGS. 1 through 5.

Figure 1:
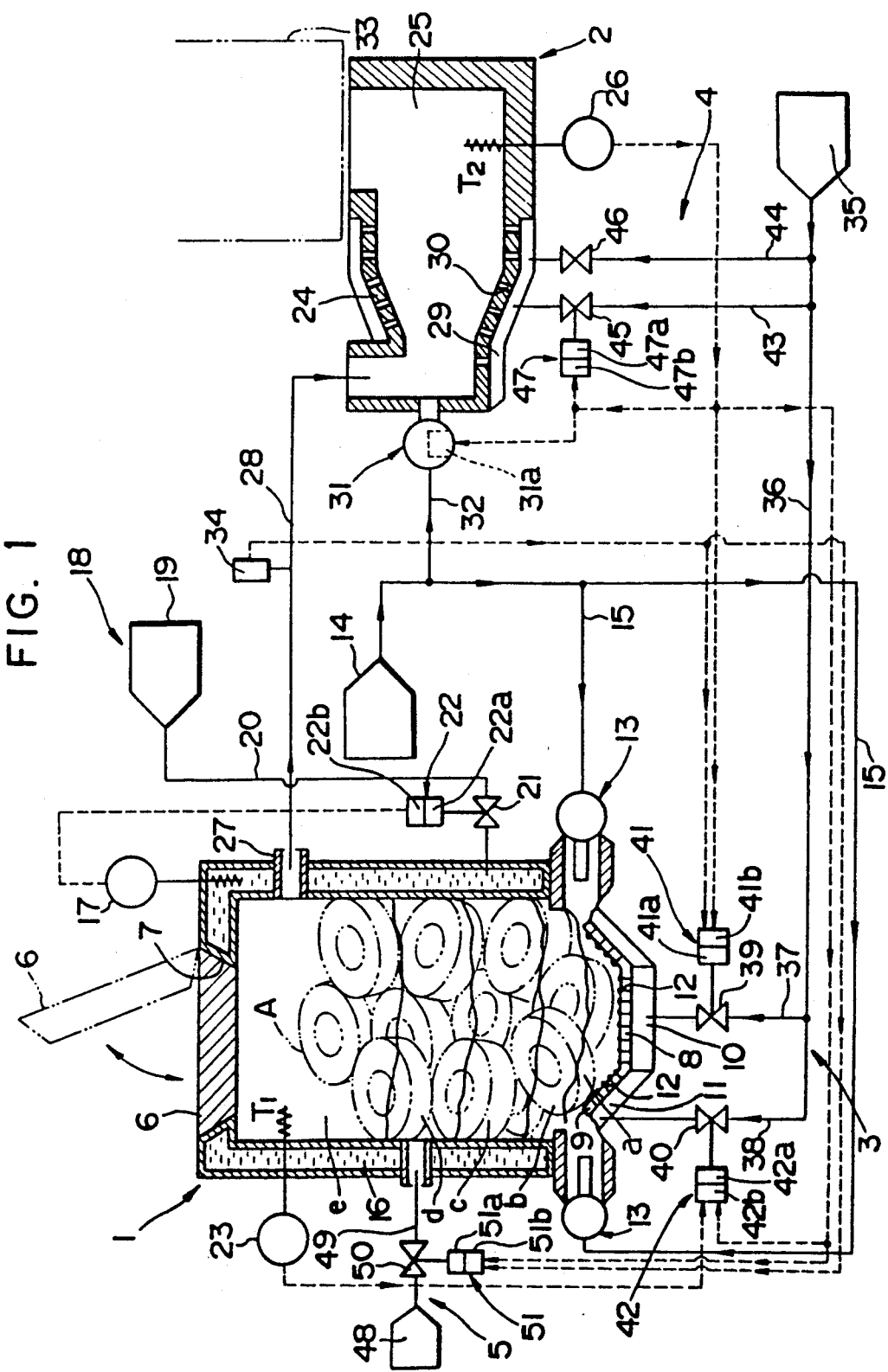
FIG. 1 is a schematic diagram of an apparatus for incinerating a waste material according to the present invention.

FIG. 1 schematically shows an arrangement of the apparatus, and FIGS. 2 through 5 show an operation sequence of the apparatus shown in FIG. 1.

As shown in FIG. 1, the apparatus includes a gasification furnace 1 for thermally decomposing by way of dry distillation, gasifying, burning, and ashing a waste material A such as waste tires placed in the gasification furnace 1, a combustion furnace 2 for combusting a combustible gas produced when the waste material A is thermally decomposed by dry distillation in the gasification furnace 1, an oxygen supply device 3 for supplying oxygen (air) to the gasification furnace 1, an oxygen supply device 4 for supplying oxygen (air) to the combustion furnace 2, and an extinguishing device 5 for extinguishing the combustion of the waste material A and the combustible gas in the gasification furnace 1.

The gasification furnace 1 has a charge inlet 7 defined in an upper wall thereof and openable and closable by a hinged door 6. The waste material A can be charged into the gasification furnace 1 through the charge inlet 7 as it is opened by the door 6. When the charge inlet 7 is closed by the door 6, the interior space of the gasification furnace 1 is virtually isolated from the ambient space.

The gasification furnace 1 has a downwardly projecting frustoconical lower wall composed of a bottom wall section 8 and a slanted side wall section 9. The bottom and side wall sections 8, 9 have respective empty chambers 10, 11 isolated from the interior space of the gasification furnace 1. The empty chambers 10, 11 are held in communication with the interior space of the gasification furnace 1 only through air supply nozzles 12 mounted in the bottom and side wall sections 8, 9.

A plurality of igniters 13 are mounted on a lower surrounding wall section of the gasification furnace 1 for igniting the waste material A placed in the gasification chamber 1. Each of the igniters 13 comprises an ignition burner or the like, and is connected through a fuel supply pipe 15 to a fuel supply device 14 for supplying a combustion assistant fuel, the fuel supply device 14 being disposed outside of the gasification furnace 1. The igniters 13 burn the combustion assistant fuel supplied from the fuel supply device 14 through the fuel supply pipes 15 to produce flames that are directed into the gasification furnace 1 to ignite the waste material 1 in the gasification furnace 1.

The gasification furnace 1 has a water jacket 16 defined in its surrounding wall for cooling the gasification furnace 1. The water jacket 16 is isolated from the interior space of the gasification furnace 1. A water level sensor 17 for detecting a water level in the water jacket 16 is mounted on the upper wall of the gasification furnace 1.

The water jacket 16 is supplied with cooling water from a water supply device 18. The water supply device 18 comprises a water supply 19 disposed outside of the gasification furnace 1, a water supply pipe 20 interconnecting the water supply 19 and the water jacket 16, a flow control valve 21 disposed in the water supply pipe 20, and a valve controller 22 for opening and closing the flow control valve 21. The valve controller 22 is supplied with a detected water level signal from the water level sensor 17.

The valve controller 22 comprises an actuator 22a such as a motor for selectively opening and closing the flow control valve 21, and a control unit 22b comprising a CPU, etc. for controlling operation of the actuator 22a. The control unit 22b monitors the water level in the water jacket 16 as it is detected by the water level sensor 17, and operates the actuator 22a depending on the detected water level in the water jacket 16.

The flow control valve 21 is opened by the valve controller 22 to supply cooling water from the water supply 19 through the water supply pipe 20 to the water jacket 16. The valve controller 22 opens and closes the flow control valve 21 so that the water level detected by the water level sensor 18 reaches a predetermined level. The cooling water supplied to the water jacket 16 returns to the water supply 19 through a steam separator (not shown).

A temperature sensor 23 for detecting a temperature T1 in the gasification furnace 1 is mounted on an upper portion of the surrounding wall of the gasification furnace 1.

The combustion furnace 2 comprises a burner nozzle 24 for mixing a combustible gas produced when the waste material A is thermally decomposed by dry distillation, with oxygen (air) required for the complete combustion of the combustible gas, and a combustion chamber 25 for burning the combustible gas as mixed with the oxygen. The combustion chamber 25 is connected to a front end of the burner nozzle 24 and held in communication therewith. A temperature sensor 26 for detecting a temperature T2 of the combustible gas as it is burned is mounted in the combustion chamber 25.

To the rear end of the burner nozzle 24, there is connected a gas pipe 28 extending from a joint fitting 27 mounted on an upper portion of the surrounding wall of the gasification furnace 1 and held in communication with the interior of the gasification furnace 1. Therefore, the combustible gas produced when the waste material A is thermally decomposed by dry distillation is introduced through the gas pipe 28 into the burner nozzle 4.

An empty chamber 29 is defined around the burner nozzle 24 in isolated relationship to the interior space of the burner nozzle 24. The empty chamber 29 communicates with the interior space of the burner nozzle 24 through a plurality of nozzle holes 30 defined in the surrounding wall of the burner nozzle 42.

An igniter 31 for igniting the combustible gas introduced into the burner nozzle 24 is mounted on the rear end of the burner nozzle 24. The igniter 31 comprises an ignition burner or the like as with the igniters 13 on the gasification furnace 1, and is connected to the fuel supply device 14 through a fuel supply pipe 32. When fuel supplied from the fuel supply device 14 through the fuel supply pipe 32 to the igniter 31 is ignited by the igniter 31, flames are produced and directed through the burner nozzle 24 into the combustion chamber 25 to ignite the combustible gas that is introduced from the burner nozzle 24 into the combustion chamber 24.

The igniter 31 is associated with an igniter controller 31a for controlling igniting operation thereof, the igniter controller 31a being supplied with a detected signal from the temperature sensor 26. The igniter controller 31a monitors the temperature of the combustible gas as detected by the temperature sensor 26, and controls the igniter 31 to ignite the combustible gas depending on the detected temperature of the combustible gas.

A boiler 33, for example, is connected to the combustion furnace 2. The boiler 33 uses, as a heat source, the heat of combustion of the combustible gas in the combustion chamber 25.

The gas pipe 28 which interconnects the gasification furnace 1 and the combustion furnace 2 is associated with an oxygen sensor 34 for detecting the amount of oxygen that is mixed with the combustion gas introduced from the gasification furnace 1 into the combustion chamber 2.

The oxygen supply device 3 for supplying oxygen to the gasification furnace 1 comprises an oxygen supply 35 disposed outside of the gasification furnace 1, a main oxygen supply pipe 36 extending from the oxygen supply 35, a pair of auxiliary oxygen supply pipes 37, 38 branched from the main oxygen supply pipe 36 and connected respectively to the empty chambers 10, 11 of the gasification chamber 1, a pair of flow control valves 39, 40 disposed respectively in the auxiliary oxygen supply pipes 37, 38, and a pair of valve controllers 41, 42 for controlling the flow control valves 39, 40, respectively. The valve controller 41 is supplied with the detected signal from the temperature sensor 26 and the detected signal from the oxygen sensor 34. The valve controller 42 is supplied with the detected signals from the temperature sensors 26, 23.

The valve controller 41 comprises an actuator 41a such as a motor for opening and closing the flow control valve 39, and a control unit 41b comprising a CPU, a timer, etc. for controlling operation of the actuator 41a. The control unit 41b monitors the temperature T2 of the combustible gas as it is detected by the temperature sensor 26 and the amount of oxygen in the gas pipe 28 as it is detected by the oxygen sensor 34, calculates a rate of change per unit time of the temperature T2 based on the detected temperature T2 of the combustible gas, and operates the actuator 41a depending on the detected temperature T2, the detected amount of oxygen, and the calculated rate of change per unit time of the temperature T2. Similarly, the valve controller 42 comprises an actuator 42a such as a motor for opening and closing the flow control valve 40, and a control unit 42b comprising a CPU, etc. for controlling operation of the actuator 42a. The control unit 42b monitors the temperature T1 in the gasification furnace 1 as it is detected by the temperature sensor 23 and the temperature T2 of the combustible gas as it is detected by the temperature sensor 26, and operates the actuator 42a depending on the detected temperatures T1, T2.

While the waste material A is being thermally decomposed by dry distillation in the gasification furnace 1, the valve controller 41 of the oxygen supply device 3 opens the flow control valve 39 to supply oxygen (air) from the oxygen supply 35 through the oxygen supply pipes 36, 37 into the empty chamber 10 of the gasification furnace 1. The supplied oxygen is then supplied from the empty chamber 10 through the air supply nozzles 12 into the gasification furnace 1. At this time, the valve controller 41 regulates the opening of the flow control valve 39 depending on the temperature T2 of the combustible gas as detected by the temperature sensor 26. When the calculated rate of change per unit time of the temperature T2 exceeds a predetermined value, or when the amount of oxygen in the gas pipe 28 as detected by the oxygen sensor 34 exceeds a predetermined value, the valve controller 41 closes the flow control valve 39.

At the time the flow control valve 39 is opened by the valve controller 41 when the dry distillation of the waste material A is finished, the flow control valve 40 is also opened by the valve controller 42. At this time, therefore, oxygen (air) is supplied from the oxygen supply 35 through the oxygen supply pipes 36, 38 to the empty chamber 11 of the gasification furnace 1, from which the oxygen is supplied though the air supply nozzles 12 into the gasification chamber 1. The valve controller 42 opens the flow control valve 40 at a predetermined time based on the temperature T1 in the gasification furnace 1 as detected by the temperature sensor 23 and the temperature T2 of the combustible gas as detected by the temperature sensor 26.

The oxygen supply device 4 for supplying oxygen to the combustion furnace 2 comprises the oxygen supply 35, the main oxygen supply pipe 36, a pair of auxiliary oxygen supply pipes 43, 44 branched from the main oxygen supply pipe 36 and connected to the empty chamber 29 of the combustion chamber 2, a pair of flow control valves 45, 46 disposed respectively in the auxiliary oxygen supply pipes 43, 44, and a valve controller 47 for controlling the flow control valve 45. The valve controller 47 is supplied with the detected signal from the temperature sensor 26.

The valve controller 47 comprises an actuator 47a such as a motor for opening and closing the flow control valve 45, and a control unit 47b comprising a CPU, etc. for controlling operation of the actuator 47a. The control unit 47b monitors the temperature T2 of the combustible gas as it is detected by the temperature sensor 26, and operates the actuator 47a depending on the detected temperature T2.

The valve controller 47 of the oxygen supply device 4 opens the flow control valve 45 to supply oxygen (air) from the oxygen supply 35 through the oxygen supply pipes 36, 43 into the empty chamber 29 of the combustion furnace 2. The supplied oxygen is then supplied from the empty chamber 29 through the nozzle holes 30 into the burner nozzle 24 of the combustion furnace 2. At this time, the valve controller 47 opens the flow control valve 45 depending on the temperature T2 of the combustible gas as detected by the temperature sensor 26.

The flow control valve 46 is manually openable and closable by the operator for adjusting the amount of oxygen supplied from the oxygen supply 35 to the burner nozzle 24.

The extinguishing device 5 comprises a supply 48 of an incombustible gas such as carbon dioxide, disposed outside of the gasification furnace 1, a gas supply pipe 49 extending from the incombustible gas source 48 and connected to the surrounding wall of the gasification furnace 1 in communication therewith, a flow control valve 50 disposed in the gas supply pipe 49, and a valve controller 51 for opening and closing the flow control valve 50. The valve controller 51 is supplied with the detected signals from the temperature sensor 26 and the oxygen sensor 34.

The valve controller 51 comprises an actuator 51a such as a motor for opening and closing the flow control valve 50, and a control unit 51b comprising a CPU, a timer, etc. for controlling operation of the actuator 51a. The control unit 51b monitors the amount of oxygen in the gas pipe 28 as it is detected by the oxygen sensor 34 and the temperature T2 of the combustible gas as it is detected by the temperature sensor 26, calculates a rate of change per unit time of the temperature T2 based on the detected temperature T2 of the combustible gas, and operates the actuator 51a depending on the detected amount of oxygen and the calculated rate of change per unit time of the temperature T2.

When the calculated rate of change per unit time of the temperature T2 exceeds a predetermined value, or when the amount of oxygen in the gas pipe 28 as detected by the oxygen sensor 34 exceeds a predetermined value, the valve controller 51 opens the flow control valve 50 to supply an incombustible gas from the incombustible gas supply 48 through the gas supply pipe 49 into the gasification furnace 1.

Operation of the incinerating apparatus of the above structure will be described below.

To incinerate a waste material A such as waste tires, the door 6 is opened, and the waste material A is charged into the gasification furnace 1 through the charge inlet 7.

After the door 6 is closed, the igniters 13 are actuated to ignite the waste material A at a plurality of surrounding locations in its lower portion. The waste material A now starts to be burned partially at such plural locations. When the waste material A starts to be burned partially, the igniters 13 are inactivated.

Before the waste material A is ignited, the water jacket 16 of the gasification furnace 1 has been supplied with cooling water from the water supply 19 through the water supply pipe 20, and the igniter 31 of the combustion furnace 18 has been operated under the control of the igniter controller 31a. The interior space of the gasification furnace 1 is evacuated by a suction fan or the like in the boiler 33 through the combustion furnace 2 and the gas pipe 28 in order draw a generated combustible gas (described later) from the gasification furnace 1 into the combustion furnace 2.

Figure 4:
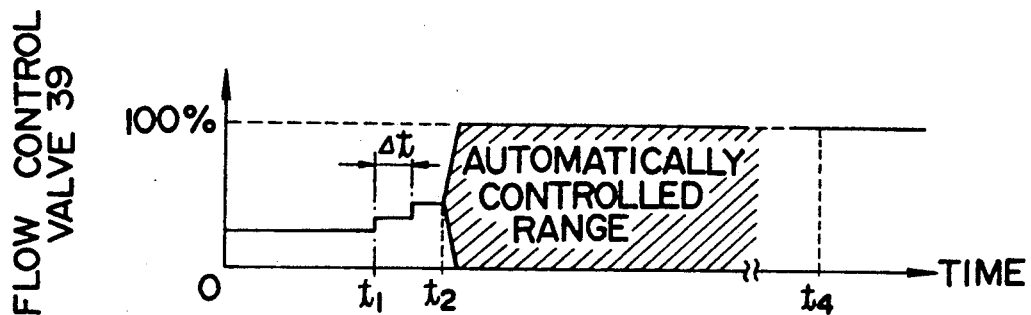
FIG. 4 is a graph showing the manner in which a flow control valve of the apparatus operates in the operation sequence shown in FIG. 2.

When the waste material A is ignited, the flow control valve 39 of the oxygen supply device 3 has been opened to a relatively small degree, as shown in FIG. 4, by the valve controller 41. Therefore, a relatively small amount of oxygen has already been supplied from the oxygen supply 35 through the oxygen supply pipes 36, 37, the empty chamber 10, and the air supply nozzles 12 into the gasification furnace 1. Therefore, the waste material A is ignited by the igniters 13 and then starts being partly burned using any oxygen that has been present in the gasification furnace 1 and the relatively small amount of oxygen that has been supplied from the oxygen supply 35. The amount of oxygen supplied from the oxygen supply 35 to the gasification furnace 1 is only sufficient enough to be able to ignite the waste material A and partly burn the waste material A subsequently to the ignition.

At the time the waste material A is ignited, the flow control valve 40 of the oxygen supply device 3 and the flow control valves 45, 46 of the oxygen supply device 4 are closed, and the flow control valve 50 of the extinguishing device 5 is also closed.

When the lower portion of the waste material A starts being partly burned, the upper portion of the waste material A starts to be thermally decomposed by way of dry distillation due to the heat of combustion. As the dry distillation begins, the waste material A starts producing a combustible gas, which is introduced from the gasification furnace 1 through the gas pipe 28 into the burner nozzle 24 of the combustion furnace 2. The combustible gas supplied to the burner nozzle 24 is mixed with air (oxygen) present in the combustion furnace 2, and is ignited by the igniter 31. Now, the combustible gas starts being combusted in the combustion chamber 25 of the combustion furnace 2.

Figure 2:
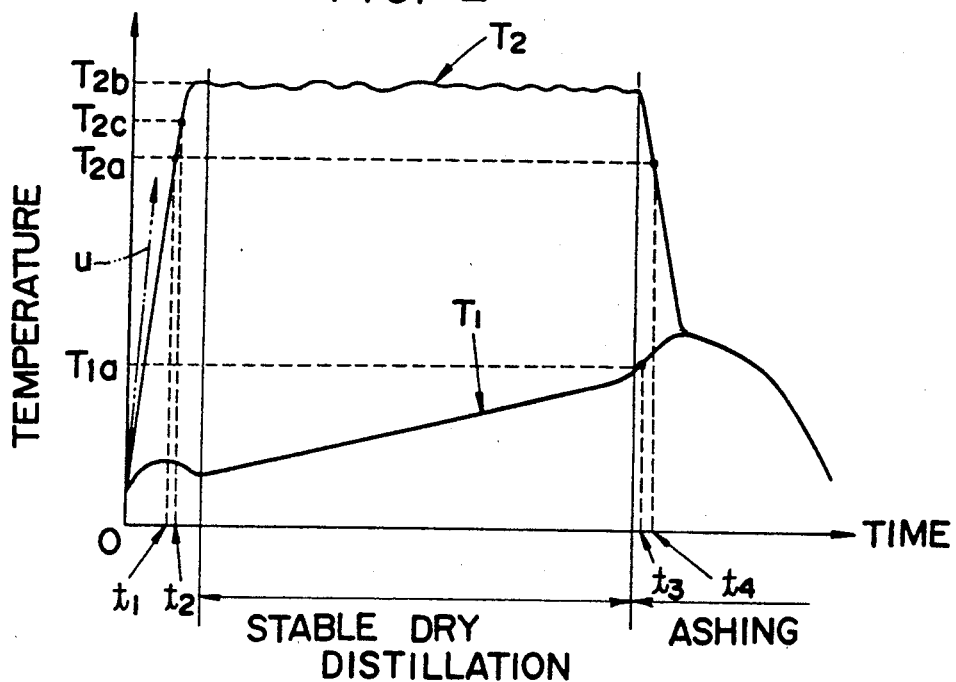
FIG. 2 is a graph illustrative of an operation sequence of the apparatus according to the present invention.

The partial combustion of the waste material A in the gasification furnace 1 is progressively stabilized while consuming the small amount of oxygen supplied from the oxygen supply 35. The region where the waste material A is burned is progressively spread in the lower portion of the waste material to the extent possible with the oxygen supplied from the oxygen supply 35. As the combustion of the lower portion of the waste material A is progressively stabilized, the dry distillation of the upper portion of the waste material A with the heat of combustion is progressively rendered more active, producing a progressively larger amount of combustible gas. Therefore, the amount of combustible gas introduced into the combustion furnace 2 is increased, and the temperature T2 of the combustion gas as it is burned in the combustion furnace 2 rises, as shown in FIG. 2.

At this time, the temperature T2 of the combustion gas is detected by the temperature sensor 26. When the detected temperature T2 of the combustion gas reaches a predetermined temperature T2a at a time t1 in FIG. 2, the valve controller 41 of the oxygen supply device 3 increases the opening of the flow control valve 39 from the initial opening for a predetermined period of time $\Delta t$, as shown in FIG. 4. After the period of time $\Delta t$ has elapsed, the valve controller 41 further increases the opening of the flow control valve 39.

Since the opening of the flow control valve 39 is thus progressively increased stepwise, the amount of oxygen supplied from the oxygen supply 35 to the gasification furnace 1 is also increased stepwise while being limited to the extent that is required to continue the partial combustion of the lower portion of the waste material A. The combustion of the lower portion of the waste material A is therefore progressively stabilized by consuming almost all of the oxygen supplied from the oxygen supply 35. The region where the waste material A is burned is spread to the extent possible with such consumption of the oxygen supplied from the oxygen supply 35. Consequently, the region where the waste material A is burned is not unduly spread larger than necessary. The dry distillation of the upper portion of the waste material A caused by the combustion of the lower portion thereof also stably progresses.

The temperature T2 of the combustible gas as it is detected by the temperature sensor 26 further increases to a temperature $T2c$ at a time t2 (FIG. 2), which is lower than a preset temperature $T2b$ at which the combustible gas starts spontaneous combustion and nitrogen oxides produced by such combustion are small ($T2a < T2c < T2b$). When the temperature T2 reaches the temperature $T2c$, the valve controller 41 of the oxygen supply device 3 automatically adjusts the opening of the flow control valve 39 to keep the temperature T2 of the combustible gas at the temperature $T2b$.

The automatic adjustment of the opening of the flow control valve 39 is effected as follows:

When the temperature T2 becomes lower than the temperature $T2b$, the opening of the flow control valve 39 is increased to increase the amount of oxygen supplied to the gasification furnace 1. The combustion of the lower portion of the waste material A is promoted, accelerating the dry distillation of the upper portion of the waste material A due to the heat of combustion and the generation of the combustible gas due to the dry distillation.

Conversely, when the temperature T2 becomes higher than the temperature $T2b$, the opening of the flow control valve 39 is reduced to reduce the amount of oxygen supplied to the gasification furnace 1. The combustion of the lower portion of the waste material A is suppressed, retarding the dry distillation of the upper portion of the waste material A due to the heat of combustion and the generation of the combustible gas due to the dry distillation.

Therefore, as shown in FIG. 2, the temperature T2 of the combustible gas as it is controlled is maintained at the temperature $T2b$, at which the combustion of the lower portion of the waste material A and the dry distillation of the upper portion thereof progress stably.

When the temperature T2 is maintained at the temperature $T2b$ for spontaneous combustion, the igniter 31 of the combustion furnace 2 is inactivated by the igniter controller 31a, and the combustible gas is continuously burned by way of spontaneous combustion. The heat of combustion of the combustible gas is utilized as the heat source of the boiler 33.

While the lower portion of the waste material A is being burned and the upper remaining portion thereof is being thermally decomposed by dry distillation, there are developed, in the interior space of the gasification furnace 1, an ashing layer a, a red-hot layer b, a fluidized layer c, a heat transfer layer d, and a gas layer e, arranged successively from the bottom to the top of the gasification furnace 1. Of these layers, the ashing layer a developed upon completion of combustion of the waste material A spreads upwardly as the partial combustion of the waste material A progresses, and the red-hot layer b where the waste material A is burned is progressively shifted upwardly.

During the dry distillation of the waste material A in the gasification furnace 1, the temperature T1 in the gasification furnace 1 is detected by the temperature sensor 23. The detected temperature T1 varies as shown in FIG. 2.

Specifically, as shown in FIG. 2, in an initial stage of the dry distillation of the waste material A, the temperature T1 rises as the lower portion of the waste material A starts being burned. Then, the temperature T1 temporarily drops because the heat of combustion is absorbed by the dry distillation of the waste material A. When the dry distillation of the waste material A progresses stably, the temperature T1 increases again as the combustion of the lower portion of the waste material A progresses.

The oxygen which is required by the combustion of the combustible gas in the combustion furnace 2 is supplied from the oxygen supply device 4 depending on the temperature T2 of the combustible gas which is detected by the temperature sensor 26.

More specifically, the valve controller 47 of the oxygen supply device 4 opens the flow control valve 45 to a suitable degree depending on the temperature T2 as detected by the temperature sensor 26. The oxygen supply 35 now supplies oxygen through the oxygen supply pipes 36, 43, the flow control valve 45, the empty chamber 29, and the nozzle holes 30 into the burner nozzle 24 of the combustion furnace 2. The combustible gas introduced into the combustion furnace 2 and the oxygen required for complete combustion of the combustible gas are mixed in the burner nozzle 24.

In the initial stage of the dry distillation of the waste material A, the amount of combustible gas introduced into the combustion furnace 2 is increased, thus increasing the temperature T2 of the combustible gas as it is burned. As the temperature T2 is thus increased, the opening of the flow control valve 45 is increased to increase the amount of oxygen supplied to the combustion furnace 2. In the stage in which the dry distillation of the waste material A progresses stably, when the temperature T2 of the combustible gas slightly fluctuates, i.e., increases and decreases, the flow control valve 45 is controlled to increase and decrease its opening for thereby adjusting the amount of oxygen supplied to the combustion furnace 2. The combustible gas introduced into the combustion furnace 1 is therefore mixed with the amount of oxygen which is necessary to completely combust the combustible gas in the combustion furnace 2.

When the combustion furnace 2 is supplied with oxygen, the operator may manually operate on the flow control valve 46 while confirming the condition in which the combustible gas is being burned in the combustion furnace 2, thereby regulating the amount of oxygen supplied to the combustion furnace 1.

Upon the dry distillation of the waste material A, the amount of oxygen in the gas pipe 28 is detected by the oxygen sensor 34. The detected amount of oxygen normally varies along a curve x or a curve y or any curve between these curves x, y (FIG. 3) as the dry distillation progresses from the ignition of the waste material A.

More specifically, the oxygen present in the gasification furnace 1 and the oxygen supplied from the oxygen supply 35 are consumed by the igniters 13 when the waste material A is ignited, and are thereafter progressively consumed as the waste material starts being partly burned by the ignition. Therefore, the oxygen in the gas pipe 28 is progressively reduced after the waste material A is ignited. Immediately after the waste material A is ignited, the oxygen is no longer consumed by the igniters 13, and the amount of oxygen consumed by the partial combustion of the waste material A is relatively small since the partial combustion is unstable. Therefore, immediately after the waste material A is ignited, the amount of oxygen in the gas pipe 28 is increased on account of the supply of oxygen from the oxygen supply 35. As the partial combustion of the waste material A is subsequently stabilized and spread, the amount of oxygen in the gas pipe 28 is reduced again. When the waste material A is stably burned and thermally decomposed by dry distillation, the amount of oxygen in the gas pipe 28 is kept at a substantially constant level.

Immediately after the ignition when the partial combustion of the waste material A is unstable, the amount of oxygen supplied from the oxygen supply 34 to the gasification furnace 1 is limited to the extent that is necessary for the partial combustion of the waste material A, and the waste material A starts being partly burned at the plural locations in the lower portion thereof. Therefore, the amount of oxygen in the gas pipe 28 does not increase to a large extent, and hence the amount of oxygen mixed with the combustible gas introduced into the combustion furnace 2 when the dry distillation of the waste material A begins is sufficiently small.

Figure 3:
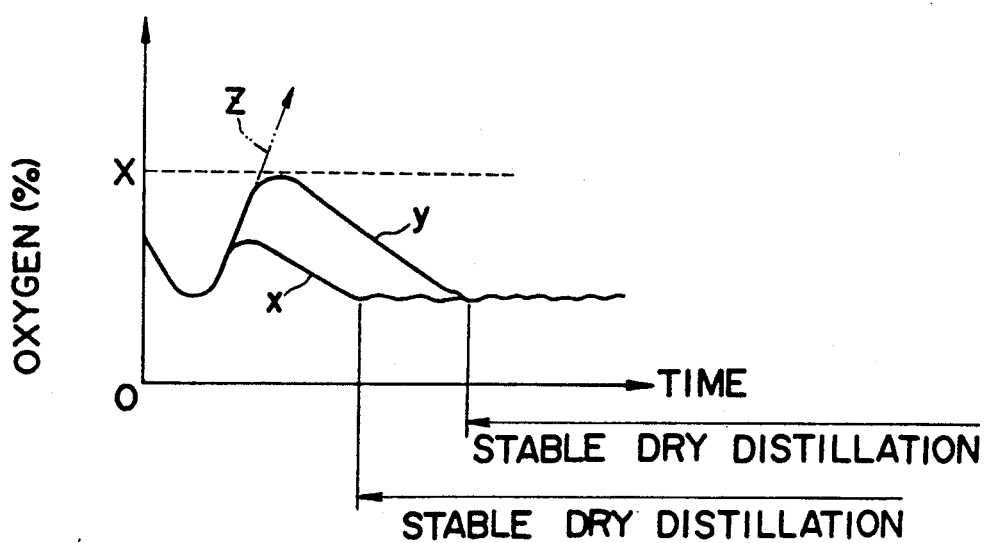
FIG. 3 is a graph showing the manner in which the amount of oxygen varies with time in the operation sequence shown in FIG. 2.

If the gasification furnace 1 were not fully sealed, if ambient air were allowed to flow into the gasification furnace 1, or if the partial combustion of the waste material A were extremely unstable, consuming only a very small amount of oxygen, then the amount of oxygen detected by the oxygen sensor 34 would greatly be increased right after the waste material A is ignited, as indicated by a curve z indicated by the imaginary line in FIG. 3.

In the event that the detected amount of oxygen greatly increases, it is possible for the combustible gas produced in the gasification furnace 1 by dry distillation to become introduced into the combustion furnace 2 while being mixed with a large amount of oxygen sufficient to burn the combustible gas. Therefore, flames produced upon combustion of the combustible gas in the combustion furnace 2 and flames produced by the igniter 31 could possibly be propagated back into the gas pipe 28 and the gasification furnace 1, causing a backfire. If such a backfire were developed, the temperature T2 of the combustible gas as it is detected by the temperature sensor 26 would sharply rise according to a curve u indicated by the imaginary line in FIG. 2.

In the incinerating apparatus according to the present invention, however, when the amount of oxygen detected by the oxygen sensor 34 exceeds a predetermined value X (FIG. 3) that has been determined empirically or experimentally, or when the rate of change of the temperature T2 which is calculated based on the temperature T2 detected by the temperature sensor 26 exceeds a predetermined value that has been determined empirically or experimentally, the valve controller 41 of the oxygen supply device 3 closes the flow control valve 39, thereby stopping the supply of oxygen from the oxygen supply 35 to the gasification furnace 1.

Consequently, the combustible gas produced in and supplied from the gasification furnace 1 is prevented from being mixed with enough oxygen to burn the combustible gas, so that a backfire will not be developed in the gas pipe 28 and the gasification furnace 1.

At the same time, when the amount of oxygen detected by the oxygen sensor 34 exceeds the predetermined value X, or when the calculated rate of change of the temperature T2 exceeds a predetermined value, the valve controller 51 of the extinguishing device 5 opens the flow control valve 50 to supply the incombustible gas from the incombustible gas supply 48 through the gas supply pipe 49 to the gasification furnace 1. The partial combustion of the waste material A is thus extinguished, and the dry distillation of the waste material A is stopped.

The generation of the combustible gas in the gasification furnace 1 is also stopped, and the combustible gas is no longer introduced in the combustion furnace 2. Accordingly, the backfire is effectively prevented from taking place.

In the initial stage of combustion and dry distillation of the waste material A, the amount of oxygen supplied from the oxygen supply 35 to the gasification furnace 1 is increased stepwise while being limited to the extent that allows the waste material A to be burned. Consequently, the combustible gas generated by the dry distillation is prevented from being mixed with enough oxygen to burn the combustible gas, when it is introduced into the combustion furnace 2. If there is nevertheless a danger such that the combustible gas is going to be mixed with enough oxygen to burn the combustible gas when it is introduced into the combustion furnace 2, then the supply of oxygen from the oxygen supply 35 to the gasification furnace 1 is stopped, and the combustion of the waste material A is extinguished, thus reliably avoiding the danger of any backfire.

When the combustion of the waste material A is extinguished, the incineration of the waste material A with the incinerating apparatus is also stopped. Since, however, the combustion of the waste material A is put out by the incombustible gas, the waste material A can be burned again after the incombustible gas in the gasification furnace 1 is replaced with air.

Ashing of the waste material A in a final stage of the dry distillation of the waste material A will be described below.

As described above, during the dry distillation of the waste material A, the ashing layer a which is initially formed in the lower portion of the gasification furnace 1 spreads upwardly as the partial combustion of the waste material A progresses. At the same time, the red-hot layer b in which the waste material A is burned is progressively shifted from the bottom toward the top of the gasification furnace 1. As the ashing layer a spreads upwardly and the red-hot layer b is progressively shifted upwardly, the fluidized layer c, the heat transfer layer d, and the gas layer e in which the dry distillation of the waste material A progresses are reduced in extent, i.e., the amount of the waste material A that can be thermally decomposed by dry distillation is reduced.

As the amount of the waste material A that can be thermally decomposed by dry distillation is reduced, regardless of the supply of oxygen to the gasification furnace 1 through the flow control valve 39, the waste material A can no longer produce the combustible gas in an amount large enough to keep the temperature T2 at the substantially constant level T2b in the combustion furnace 2. As a result, the amount of combustible gas introduced into the combustion furnace 2 is eventually reduced, and so is the temperature T2 of the combustible gas, as shown in FIG. 2.

When the temperature T2 of the combustible gas drops below the temperature T2b, the valve controller 41 opens the flow control valve 39 to accelerate the dry distillation of the waste material A. Therefore, when the temperature T2 drops below the temperature T2b, the flow control valve 49 is fully opened as shown in FIG. 4.

As the temperature T2 deceases, the red-hot layer b in the portion of the waste material A except the ashing layer a is increased, and the heat of combustion that is absorbed by the dry distillation of the waste material A is reduced. As shown in FIG. 2, the temperature T1 in the gasification furnace 1 sharply rises and then drops as the combustion and ashing of the waste material A progresses. In the stage in which the waste material A is finally ashed, it is necessary to completely combust and ash the waste material A.

Figure 5:
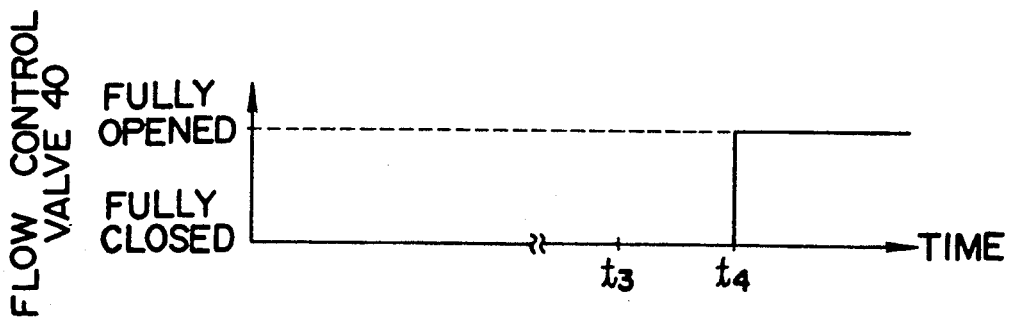
FIG. 5 is a graph showing the manner in which another flow control valve of the apparatus operates in the operation sequence shown in FIG. 2.

According to this embodiment, therefore, when the temperature T1 in the gasification furnace 1 as detected by the temperature sensor 23 rises at a time t3 (FIG. 2) beyond a predetermined temperature T1a that is preset as indicating the final stage of the dry distillation of the waste material A, and also the temperature T2a as detected by the temperature sensor 26 drops from the substantially constant temperature T2b to the temperature T2a or lower at a time t4, the valve controller 42 opens the flow control valve 40 as shown in FIG. 5, supplying oxygen from the oxygen supply 35 through the oxygen supply pipes 36, 38, the empty chamber 11, and the air supply nozzles 12 into the gasification furnace 1.

Therefore, the gasification furnace 1 is supplied with an increased amount of oxygen from the oxygen supply 35 through both the oxygen supply pipes 37, 38. The final combustion of the waste material A is thus accelerated to fully ash the waste material A in its entirety.

The temperature T1 in the gasification furnace 1 may temporarily rise in excess of the predetermined temperature T1a because the heat of combustion that is consumed by the dry distillation is lowered depending on the type of the waste material A or the manner in which it is placed in the gasification furnace 1, although there is a substantial portion of the waste material A that can be thermally decomposed by dry distillation. However, unless the temperature T2 of the combustible gas drops below the temperature T2a, the valve controller 42 does not open the flow control valve 40. As a consequence, the oxygen to accelerate the combustion and ashing of the waste material A is supplied to the gasification furnace 1 when the portion of the waste material A that can be thermally decomposed by dry distillation is eliminated almost in its entirety.

Accordingly, the final combustion and ashing of the waste material A is carried out after the dry distillation of the waste material A is fully effected.

The oxygen supply pipe 38 with the flow control valve 40 is connected to the gasification furnace 1 at a position higher than the oxygen supply pipe 37 with the flow control valve 39. Consequently, oxygen is supplied through the oxygen supply pipe 38 into the gasification furnace 1 at a position closer to the red-hod layer b than the position at which oxygen is supplied through the oxygen supply pipe 37, thus smoothly and reliably allowing the final combustion and ashing of the waste material A.

The temperature sensors 23, 26 play an important role for the smooth combustion and ashing of the waste material A, and consequently are disposed respectively in the upper portion of the gasification furnace 1 which is not directly affected by the combustion of the waste material A and in the combustion chamber 25 of the combustion furnace 2 which is not directly affected by the flames from the igniter 31. These temperature sensors 23, 26 can thus detect highly accurately the temperature T1 in the gasification furnace 1 and the temperature T2 of the combustible gas as it is burned, for the accurate supply of oxygen to the gasification furnace 1 with the oxygen supply device 3.

When the temperature T2 of the combustion gas drops, the combustible gas becomes incapable of spontaneous combustion. Upon a reduction in the temperature T2, therefore, the igniter 31 is operated by the igniter controller 31a to burn the combustible gas.

In the incinerating apparatus according to the above embodiment, the waste material A can be burned, thermally decomposed by dry distillation, and ashed smoothly and reliably, and the combustible gas produced by the dry distillation of the waste material can also be burned smoothly and reliably without giving rise to nitrogen oxides that would cause an environmental pollution. Accordingly, the waste material A can be incinerated cleanly. Inasmuch as the heat of combustion of the combustible gas is used as the heat source for the boiler 33, the thermal energy generated when the waste material A is burned is effectively utilized without loss.

The gasification furnace 1 has an ash outlet (not shown) in the lower portion thereof for discharging the finally produced ash out of the gasification furnace 1.

In the above embodiment, in the final stage of the dry distillation of the waste material A, the valve controller 42 opens the flow control valve 40 to increase the amount of oxygen supplied to the gasification furnace 1 for the promotion of the combustion and ashing of the waste material A depending on the temperature T2 of the combustible gas as detected by the temperature sensor 26 and the temperature T1 in the gasification furnace 1 as detected by the temperature sensor 23. However, the valve controller 42 may open the flow control valve 40 at a suitable time based on only the temperature T1 in the gasification furnace 1 as detected by the temperature sensor 23. An operation sequence based on such a modification will be described below.

Figure 6:
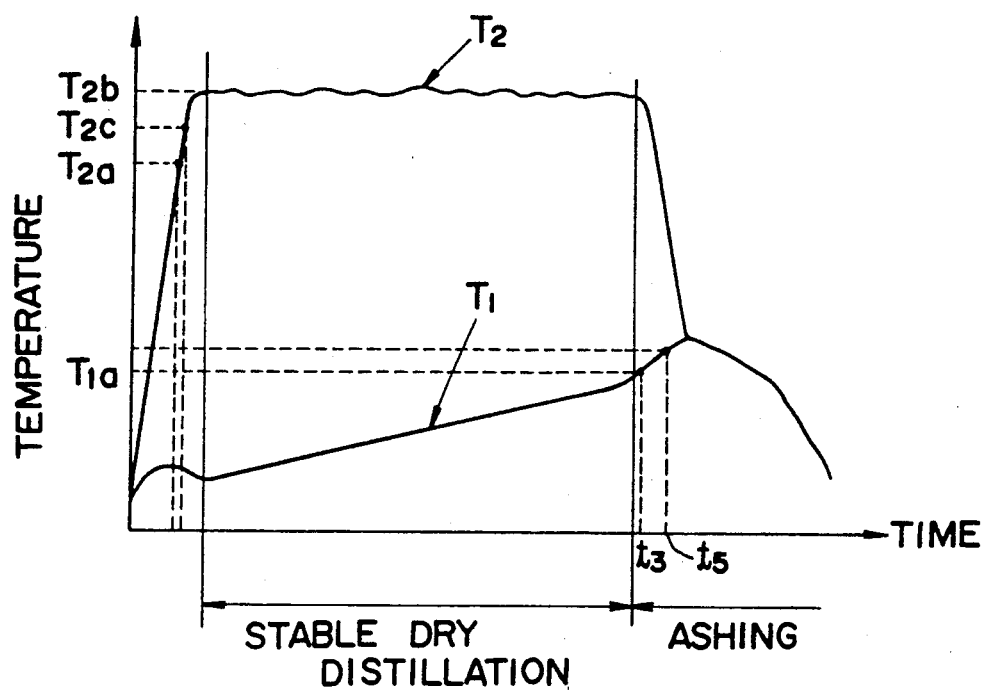
FIG. 6 is graph illustrative of another operation sequence of the apparatus according to the present invention.
Figure 7:
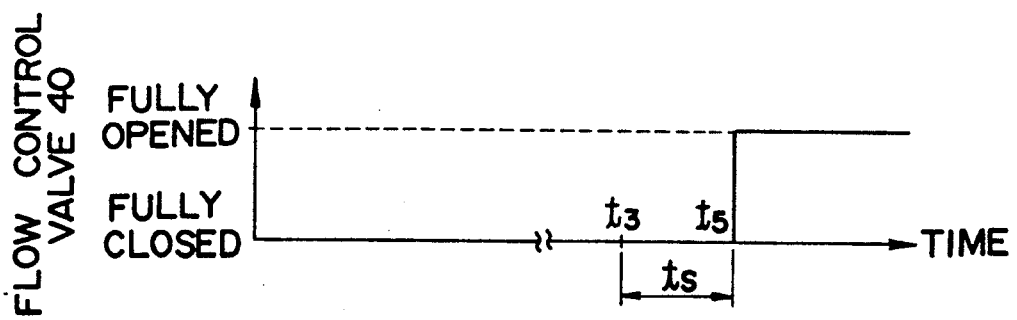
FIG. 7 is a graph showing the manner in which the other flow control valve operates in the operation sequence shown in FIG. 6.

The valve controller 42 is supplied with only the detected signal from the temperature sensor 23. The other details are the same as those of the incinerating apparatus described above. When the temperature T1 in the gasification furnace 1 as detected by the temperature sensor 23 increases up to the temperature T1a or higher at a time t3 (FIG. 6) and when a predetermined period of time ts (FIG. 7) from the time t3 has elapsed at a time t5, the valve controller 42 opens the flow control valve 40 because the dry distillation is finished, thus increasing the amount of oxygen supplied to the gasification furnace 1.

When the temperature T1 in the gasification furnace 1 as detected by the temperature sensor 23 temporarily increases up to the temperature T1a or higher regardless of the fact that there is an enough portion of the waste material A that can be thermally decomposed by dry distillation, the valve controller 42 does not open the flow control valve 40, allowing the dry distillation of the waste material A to be continued.

Normally, the temperature T1 in the gasification furnace A varies as described above. With the predetermined period of time ts being appropriately selected, the flow control valve 40 is reliably opened when the dry distillation is finished, thereby increasing the amount of oxygen supplied to the gasification furnace 1. Consequently, the final combustion and ashing of the waste material A is smoothly carried out.

Although certain preferred embodiments of the present invention have been shown and described in detail, it should be understood that various changes and modifications may be made therein without departing from the scope of the appended claims.

What is claimed is:

1. An apparatus for incinerating a waste material by processing the waste material through dry distillation and gasification, comprising:

a gasification furnace for storing a waste material therein and burning a portion of the waste material and thermally decomposing a remainder of the waste material by way of dry distillation with the heat of combustion of the portion of the waste material, thereby producing a combustible gas;

a combustion furnace for combusting the combustible gas introduced therein from said gasification furnace through a gas passage;

first temperature detecting means for detecting the temperature in said gasification furnace;

second temperature detecting means for detecting the temperature of the combustible gas as it is burned in said combustion furnace; and oxygen supply means for supplying said gasification furnace with an amount of oxygen required to burn the portion of the waste material and to thermally decompose the remainder of the waste material while controlling the amount of oxygen supplied to said gasification furnace to maintain, at a substantially constant value, the temperature of the combustible gas as detected by said second temperature detecting means during the dry distillation of the waste material, and for supplying said gasification furnace with an amount of oxygen to accelerate the combustion and ashing of the waste material when the dry distillation of the waste material is finished;

said oxygen supply means comprising means for increasing the amount of oxygen supplied to said gasification furnace to accelerate the combustion and ashing of the waste material if the temperature in said gasification furnace as detected by said first temperature detecting means increases up to a first predetermined temperature or higher as the combustion of the waste material progresses and also if the temperature of the combustible gas as detected by said second temperature detecting means drops from said substantially constant value to a second predetermined temperature or lower, when the dry distillation of the waste material is finished.

2. An apparatus according to claim 1, wherein said oxygen supply means comprises:

an oxygen supply connected to said gasification furnace through a pair of first and second oxygen supply pipes extending from the gasification furnace;

a pair of first and second flow control valves disposed in said first and second oxygen supply pipes, respectively;

first valve control means for opening said first flow control valve to supply the amount of oxygen required to burn the portion of the waste material and to thermally decompose the remainder of the waste material, from said oxygen supply to said gasification furnace and for controlling the opening of said first flow control valve to regulate the amount of oxygen supplied to said gasification furnace to maintain, at said substantially constant value, the temperature of the combustible gas as detected by said second temperature detecting means, while the dry distillation of the waste material progresses; and second valve control means for opening said second flow control valve to increase the amount of oxygen supplied from said oxygen supply to said gasification furnace if the temperature in said gasification furnace as detected by said first temperature detecting means increases up to said first predetermined temperature or higher and also if the temperature of the combustible gas as detected by said second temperature detecting means drops to said second predetermined temperature or lower, when the dry distillation of the waste material is finished.

3. An apparatus according to claim 2, further including igniting means connected to a lower portion of said gasification furnace for igniting the waste material stored in said gasification furnace, said first oxygen supply pipe with said first flow control valve disposed therein extending from a bottom of said gasification furnace, and said second oxygen supply pipe with said second flow control valve disposed therein extending from said gasification furnace at a position higher than said first oxygen supply pipe.

4. An apparatus according to claim 3, wherein said first temperature detecting means is disposed in an upper portion of said gasification furnace.

5. An apparatus according to claim 1, further including second oxygen supply means for supplying said combustion furnace with an amount of oxygen required to completely combust the combustible gas introduced into said combustion furnace, said second oxygen supply means comprising means for varying the amount of oxygen supplied to said combustion furnace depending on a change in the temperature of the combustible gas as detected by said second temperature detecting means while the dry distillation of the waste material progresses.

6. An apparatus according to claim 5, wherein said combustion furnace comprises a burner nozzle for mixing said combustible gas and the oxygen supplied from said second oxygen supply means, and a combustion chamber for combusting the combustible gas mixed with the oxygen, further including igniting means connected to said combustion furnace for igniting the combustible gas mixed with the oxygen, said gas passage being connected to said combustion furnace, said second temperature detecting means being disposed in said combustion chamber.

7. An apparatus according to claim 6, wherein said second oxygen supply means comprises an oxygen supply connected to said burner nozzle through an oxygen supply pipe extending from said burner nozzle, a flow control valve disposed in said oxygen supply pipe, and valve control means for opening said flow control valve to supply an amount of oxygen required to completely combust the combustible gas from said oxygen supply to said burner nozzle and for controlling the opening of said flow control valve to regulate the amount of oxygen supplied to said combustion furnace depending on the change in the temperature of the combustible gas as detected by said second temperature detecting means while the dry distillation of the waste material progresses.

8. An apparatus for incinerating a waste material by processing the waste material through dry distillation and gasification, comprising:

a gasification furnace for storing a waste material therein and burning a portion of the waste material and thermally decomposing a remainder of the waste material by way of dry distillation with the heat of combustion of the portion of the waste material, thereby producing a combustible gas;

a combustion furnace for combusting the combustible gas introduced therein from said gasification furnace through a gas passage;

first temperature detecting means for detecting the temperature in said gasification furnace;

second temperature detecting means for detecting the temperature of the combustible gas as it is burned in said combustion furnace; and oxygen supply means for supplying said gasification furnace with an amount of oxygen required to burn the portion of the waste material and to thermally decompose the remainder of the waste material while controlling the amount of oxygen supplied to said gasification furnace to maintain, at a substantially constant value, the temperature of the combustible gas as detected by said second temperature detecting means during the dry distillation of the waste material, and for supplying said gasification furnace with an amount of oxygen to accelerate the combustion and ashing of the waste material when the dry distillation of the waste material is finished;

said oxygen supply means comprising means for increasing the amount of oxygen supplied to said gasification furnace to accelerate the combustion and ashing of the waste material if the temperature in said gasification furnace as detected by said first temperature detecting means increases up to a predetermined temperature or higher as the combustion of the waste material progresses and also if the temperature in said gasification furnace remains to be said predetermined temperature or higher a predetermined period of time after the temperature has increased up to said predetermined temperature or higher, when the dry distillation of the waste material is finished.

9. An apparatus according to claim 8, wherein said oxygen supply means comprises:

an oxygen supply connected to said gasification furnace through a pair of first and second oxygen supply pipes extending from the gasification furnace;

a pair of first and second flow control valves disposed in said first and second oxygen supply pipes, respectively;

first valve control means for opening said first flow control valve to supply the amount of oxygen required to burn the portion of the waste material and to thermally decompose the remainder of the waste material, from said oxygen supply to said gasification furnace and for controlling the opening of said first flow control valve to regulate the amount of oxygen supplied to said gasification furnace to maintain, at said substantially constant value, the temperature of the combustible gas as detected by said second temperature detecting means, while the dry distillation of the waste material progresses; and second valve control means for opening said second flow control valve to increase the amount of oxygen supplied from said oxygen supply to said gasification furnace if the temperature in said gasification furnace as detected by said first temperature detecting means increases up to said first predetermined temperature or higher and also if the temperature in said gasification furnace remains to be said predetermined temperature or higher for said predetermined period of time after the temperature has increased up to said predetermined temperature or higher, when the dry distillation of the waste material is finished.

10. An apparatus according to claim 9, further including igniting means connected to a lower portion of said gasification furnace for igniting the waste material stored in said gasification furnace, said first oxygen supply pipe with said first flow control valve disposed therein extending from a bottom of said gasification furnace, and said second oxygen supply pipe with said second flow control valve disposed therein extending from said gasification furnace at a position higher than said first oxygen supply pipe.

11. An apparatus according to claim 10, wherein said first temperature detecting means is disposed in an upper portion of said gasification furnace.

12. An apparatus according to claim 8, further including second oxygen supply means for supplying said combustion furnace with an amount of oxygen required to completely combust the combustible gas introduced into said combustion furnace, said second oxygen supply means comprising means for varying the amount of oxygen supplied to said combustion furnace depending on a change in the temperature of the combustible gas as detected by said second temperature detecting means while the dry distillation of the waste material progresses.

13. An apparatus according to claim 12, wherein said combustion furnace comprises a burner nozzle for mixing said combustible gas and the oxygen supplied from said second oxygen supply means, and a combustion chamber for combusting the combustible gas mixed with the oxygen, further including igniting means connected to said combustion furnace for igniting the combustible gas mixed with the oxygen, said gas passage being connected to said combustion furnace, said second temperature detecting means being disposed in said combustion chamber.

14. An apparatus according to claim 13, wherein said second oxygen supply means comprises an oxygen supply connected to said burner nozzle through an oxygen supply pipe extending from said burner nozzle, a flow control valve disposed in said oxygen supply pipe, and valve control means for opening said flow control valve to supply an amount of oxygen required to completely combust the combustible gas from said oxygen supply to said burner nozzle and for controlling the opening of said flow control valve to regulate the amount of oxygen supplied to said combustion furnace depending on the change in the temperature of the combustible gas as detected by said second temperature detecting means while the dry distillation of the waste material progresses.

15. An apparatus for incinerating a waste material by processing the waste material through dry distillation and gasification, comprising:

a gasification furnace for storing a waste material therein and burning a portion of the waste material and thermally decomposing a remainder of the waste material by way of dry distillation with the heat of combustion of the portion of the waste material, thereby producing a combustible gas;

a combustion furnace for combusting the combustible gas introduced therein from said gasification furnace through a gas passage;

igniting means for igniting the waste material stored in said gasification furnace;

temperature detecting means for detecting the temperature of the combustible gas as it is burned in said combustion furnace;

oxygen supply means for supplying said gasification furnace with an amount of oxygen required to burn the portion of the waste material and to thermally decompose the remainder of the waste material to increase the temperature of the combustible gas as detected by said temperature detecting means and maintain the increased temperature at a substantially constant value after the portion of the waste material starts being burned and the remainder of the waste material starts being thermally decomposed; and oxygen detecting means in said gas passage for detecting an amount of oxygen mixed with the combustible gas introduced from said gasification furnace into said combustion furnace;

said oxygen supply means comprising means for stopping supplying oxygen to said gasification furnace when the amount of oxygen as detected by said oxygen detecting means exceeds a predetermined value.

16. An apparatus according to claim 15, wherein said oxygen supply means comprises:

an oxygen supply connected to said gasification furnace through an oxygen supply pipe extending from the gasification furnace;

a flow control valve disposed in said oxygen supply pipe; and valve control means for controlling an opening of said flow control valve;

said valve control means comprising means for controlling the opening of said flow control valve to regulate the amount of oxygen supplied from said oxygen supply to said gasification furnace in order to increase the temperature of the combustible gas as detected by said temperature detecting means and maintain the increased temperature at said substantially constant value when the amount of oxygen detected by said oxygen detecting means is of said predetermined value or lower, and for closing said flow control valve when the amount of oxygen detected by said oxygen detecting means exceeds said predetermined value.

17. An apparatus according to claim 15, wherein said oxygen supply means comprises means for increasing stepwise and limiting the amount of oxygen supplied to said gasification furnace to an extent which allows the portion of the waste material to be continuously burned when the amount of oxygen as detected by said oxygen detecting means is of said predetermined value or lower and when the temperature of the combustible gas as detected by said temperature detecting means increases after the waste material stored in said gasification furnace is ignited.

18. An apparatus according to claim 15, wherein said oxygen supply means comprises means for stopping the supply of oxygen to said gasification furnace if a rate of change per unit time of the temperature of the combustible gas exceeds a predetermined value, when the amount of oxygen as detected by said oxygen detecting means is of said predetermined value or lower and when the temperature of the combustible gas as detected by said temperature detecting means increases after the waste material stored in said gasification furnace is ignited.

19. An apparatus according to claim 15, wherein said igniting means comprises a plurality of igniters disposed on a surrounding wall of said gasification furnace for igniting the waste material at a plurality of locations at the surrounding wall of the gasification furnace.

20. An apparatus according to claim 15, further including extinguishing means for extinguishing the combustion of the waste material when the amount of oxygen detected by said oxygen detecting means exceeds said predetermined value after the waste material stored in said gasification furnace is ignited.

21. An apparatus according to claim 20, wherein said extinguishing means comprises:
a supply of an incombustible gas;
a gas supply pipe extending from said supply of the incombustible gas and connected to said gasification furnace;
a flow control valve disposed in said gas supply pipe; and
valve control means for opening said flow control valve to supply the incombustible gas to said gasification furnace to extinguish the combustion of the waste material when the amount of oxygen detected by said oxygen detecting means exceeds said predetermined value.

22. An apparatus for incinerating a waste material by processing the waste material through dry distillation and gasification, comprising:
a gasification furnace for storing a waste material therein and burning a portion of the waste material and thermally decomposing a remainder of the waste material by way of dry distillation with the heat of combustion of the portion of the waste material, thereby producing a combustible gas;
a combustion furnace for combusting the combustible gas introduced therein from said gasification furnace through a gas passage;
igniting means for igniting the waste material stored in said gasification furnace;
temperature detecting means for detecting the temperature of the combustible gas as it is burned in said combustion furnace; and
oxygen supply means for supplying said gasification furnace with an amount of oxygen required to burn the portion of the waste material and to thermally decompose the remainder of the waste material, to increase the temperature of the combustible gas as detected by said temperature detecting means and maintain the increased temperature at a substantially constant value after the portion of the waste material starts being burned and the remainder of the waste material starts being thermally decomposed;
said oxygen supply means comprising means for increasing stepwise and limiting the amount of oxygen supplied to said gasification furnace to an extent which allows the portion of the waste material to be continuously burned when the temperature of the combustible gas as detected by said temperature detecting means increases after the waste material stored in said gasification furnace is ignited.

23. An apparatus according to claim 22, wherein said oxygen supply means comprises:
an oxygen supply connected to said gasification furnace through an oxygen supply pipe extending from the gasification furnace;
a flow control valve disposed in said oxygen supply pipe; and
valve control means for controlling an opening of said flow control valve;
said valve control means comprising means for increasing the opening of said flow control valve stepwise to increase stepwise and limit the amount of oxygen supplied to said gasification furnace to the extent which allows the portion of the waste material to be continuously burned when the temperature of the combustible gas as detected by said temperature detecting means increases after the waste material stored in said gasification furnace is ignited, and for controlling the opening of said flow control valve to regulate the amount of oxygen supplied to said gasification furnace in order to maintain the temperature of the combustible gas at said substantially constant value after the temperature of the combustible gas has increased up to said predetermined value.

24. An apparatus according to claim 22, wherein said oxygen supply means comprises means for stopping the supply of oxygen to said gasification furnace when a rate of change per unit time of the temperature of the combustible gas exceeds a predetermined value and when the temperature of the combustible gas as detected by said temperature detecting means increases after the waste material stored in said gasification furnace is ignited.

25. An apparatus according to claim 24, further including extinguishing means for extinguishing the combustion of the waste material when the rate of change per unit time of the temperature of the combustible gas exceeds a predetermined value and when the temperature of the combustible gas as detected by said temperature detecting means increases after the waste material stored in said gasification furnace is ignited.

26. An apparatus according to claim 25, wherein said extinguishing means comprises:
a supply of an incombustible gas;
a gas supply pipe extending from said supply of the incombustible gas and connected to said gasification furnace;
a flow control valve disposed in said gas supply pipe; and
valve control means for opening said flow control valve to supply the incombustible gas to said gasification furnace to extinguish the combustion of the waste material when the amount of oxygen detected by said oxygen detecting means exceeds said predetermined value.

27. An apparatus according to claim 22, wherein said igniting means comprises a plurality of igniters disposed on a surrounding wall of said gasification furnace for igniting the waste material at a plurality of locations at the surrounding wall of the gasification furnace.

28. An apparatus for incinerating a waste material by processing the waste material through dry distillation and gasification, comprising:

a gasification furnace for storing a waste material therein and burning a portion of the waste material and thermally decomposing a remainder of the waste material by way of dry distillation with the heat of combustion of the portion of the waste material, thereby producing a combustible gas;

a combustion furnace for combusting the combustible gas introduced therein from said gasification furnace through a gas passage;

igniting means for igniting the waste material stored in said gasification furnace;

temperature detecting means for detecting the temperature of the combustible gas as it is burned in said combustion furnace; and oxygen supply means for supplying said gasification furnace with an amount of oxygen required to burn the portion of the waste material and to thermally decompose the remainder of the waste material, to increase the temperature of the combustible gas as detected by said temperature detecting means and maintain the increased temperature at a substantially constant value after the portion of the waste material starts being burned and the remainder of the waste material starts being thermally decomposed;

said oxygen supply means comprising means for stopping the supply of oxygen to said gasification furnace when a rate of change per unit time of the temperature of the combustible gas exceeds a predetermined value and when the temperature of the combustible gas as detected by said temperature detecting means increases after the waste material stored in said gasification furnace is ignited.

29. An apparatus according to claim 28, wherein said oxygen supply means comprises:

an oxygen supply connected to said gasification furnace through an oxygen supply pipe extending from the gasification furnace;

a flow control valve disposed in said oxygen supply pipe; and valve control means for controlling an opening of said flow control valve;

said valve control means comprising means for increasing the opening of said flow control valve stepwise to increase stepwise and limit the amount of oxygen supplied from said oxygen supply to said gasification furnace to the extent which allows the portion of the waste material to be continuously burned when the rate of change per unit time of the temperature of the combustible gas is of said predetermined value or lower and when the temperature of the combustible gas as detected by said temperature detecting means increases after the waste material stored in said gasification furnace is ignited, for closing said flow control valve when the rate of change per unit time of the temperature of the combustible gas exceeds said predetermined value, and for controlling the opening of said flow control valve to regulate the amount of oxygen supplied to said gasification furnace in order to maintain the temperature of the combustible gas at said substantially constant value after the temperature of the combustible gas has increased up to said predetermined value.

30. An apparatus according to claim 28, wherein said igniting means comprises a plurality of igniters disposed on a surrounding wall of said gasification furnace for igniting the waste material at a plurality of locations at the surrounding wall of the gasification furnace.

31. An apparatus according to claim 28, further including extinguishing means for extinguishing the combustion of the waste material when the rate of change per unit time of the temperature of the combustible gas exceeds a predetermined value and when the temperature of the combustible gas as detected by said temperature detecting means increases after the waste material stored in said gasification furnace is ignited.

32. An apparatus according to claim 31, wherein said extinguishing means comprises:

a supply of an incombustible gas;

a gas supply pipe extending from said supply of the incombustible gas and connected to said gasification furnace;

a flow control valve disposed in said gas supply pipe; and valve control means for opening said flow control valve to supply the incombustible gas to said gasification furnace to extinguish the combustion of the waste material when the amount of oxygen detected by said oxygen detecting means exceeds said predetermined value.

* * * * *